United States Patent
Grossetete

(10) Patent No.: US 8,654,916 B2
(45) Date of Patent: Feb. 18, 2014

(54) METHOD FOR REGULATION OF OPERATIONAL PARAMETERS OF THE CORE OF A PRESSURISED WATER NUCLEAR REACTOR

(75) Inventor: Alain Grossetete, Nanterre (FR)

(73) Assignee: Areva NP, Courbevoie (FR)

( * ) Notice: Subject to any disclaimer, the term of this patent is extended or adjusted under 35 U.S.C. 154(b) by 0 days.

(21) Appl. No.: 11/751,346

(22) Filed: May 21, 2007

(65) Prior Publication Data

US 2008/0069288 A1    Mar. 20, 2008

(30) Foreign Application Priority Data

May 22, 2006   (FR) ..................... 06 04572

(51) Int. Cl.
*G21C 7/36*    (2006.01)
*G21C 7/06*    (2006.01)

(52) U.S. Cl.
USPC ........... 376/216; 376/217; 376/219; 376/236; 376/237

(58) Field of Classification Search
USPC .......................... 376/216, 217, 219, 236, 237
See application file for complete search history.

(56) References Cited

U.S. PATENT DOCUMENTS

| | | | |
|---|---|---|---|
| 4,470,949 A * | 9/1984 | Deroubaix et al. | 376/217 |
| 4,844,856 A * | 7/1989 | Cohen et al. | 376/217 |

FOREIGN PATENT DOCUMENTS

| | | |
|---|---|---|
| DE | 24 46 247 A1 | 4/1976 |
| EP | 0 128 834 A | 12/1984 |
| EP | 0 336 338 A1 | 10/1989 |
| FR | 2 493 582 A1 | 5/1982 |
| FR | 2 544 907 A1 | 10/1984 |

\* cited by examiner

*Primary Examiner* — Jack W Keith
*Assistant Examiner* — Frank J McGue
(74) *Attorney, Agent, or Firm* — Novak Druce Connolly Bove + Quigg LLP

(57) ABSTRACT

The invention relates to a method for regulation of operational parameters of the core of a pressurised water nuclear reactor comprising:

a step of acquisition of values (FH, FB, TBC, TBF, Q) which are representative of the conditions of operating of the core of the reactor;

a step of evaluation of the actual values (Tmoye, AOe, $\hat{P}$ maxe) of the operational parameters at least according to the values acquired (FH, FB, TBC, TBF, Q);

a step of selection of a control law for the concentration of a neutron-absorbent component ([B]) and for the positions of insertion (Z1 to Z5) of the groups (P1 to P5) of rods selected from at least the first and second control laws which are different from one another; and a step of regulation of the operational parameters by means of the control law selected, according to set points (Tmoyc, AOc, $\hat{P}$ maxc) relative to the said parameters and to the actual values (Tmoye, AOe, $\hat{P}$ maxe) evaluated.

17 Claims, 7 Drawing Sheets

METHOD FOR REGULATION OF OPERATIONAL PARAMETERS OF THE CORE OF A PRESSURISED WATER NUCLEAR REACTOR

TECHNICAL FIELD

The invention relates in general to the methods applicable for controlling nuclear reactors.

More specifically, the invention relates to a method for regulation of operational parameters of the core of a pressurised water nuclear reactor, this nuclear reactor comprising:
- a core which is divided into a high zone and a low zone, and produces thermal power;
- a plurality of groups of rods for controlling the reactivity of the core, each of which can occupy in the core a plurality of insertion positions which are stepped vertically starting from a high position;
- means for inserting each group of rods in the core vertically from the top downwards, as far as one of the insertion positions;
- a primary circuit which can assure the circulation of a primary cooling fluid through the core;
- means for adjusting the concentration of at least one neutron-absorbent component in the primary cooling fluid; and
- means for acquiring values which are representative of the conditions of operation of the core of the reactor.

BACKGROUND TO THE INVENTION

A method is known from document FR-2 493 582 wherein the temperature of the primary fluid is regulated automatically by displacement of the groups of control rods according to the power required from the turbine, the current temperature value and a reference temperature. The axial distribution of thermal power (and neutron flux distribution) is regulated automatically by displacing certain groups, selected in an appropriate manner. Finally, the parameter which is representative of the capacity to increase the power of the reactor is controlled by an operator, by adjusting the concentration of boron in the primary fluid by injection either of pure water, or of a concentrated boron solution.

According to this method, a group must be kept inserted permanently in the low part of the core, in order to be able to assure control of the axial distribution of power. This constraint is impossible to meet when the reactor is operating with high power, since all the groups of control rods are then situated in the high part of the core. In this case, the operators must inhibit the automatic regulation of the temperature and of the axial distribution of power in accordance with the above-described method, and must change it over to another operating mode which permits only automatic regulation of the temperature.

This changeover requires stabilisation of the nuclear reactor: the above-described method for regulation of the core therefore does not make it possible to vary the power of the turbine automatically when the sets are situated in the zone of changeover between the two regulation modes. Operation of the reactor "with frequency regulation" is not possible in this zone, since this functioning consists of modulating the power of the turbine in order to maintain the frequency of the electrical network which is supplied by the reactor at 50 Hertz.

SUMMARY OF THE INVENTION

In this context, the object of the invention is to propose a method for regulation of the core of a nuclear reactor which makes it possible to carry out efficient automatic control of the three aforementioned operational parameters (temperature of the primary fluid, axial distribution of power, capacity to increase the power) over a greater range of operating power of the reactor.

For this purpose, the invention relates to a method for regulation of the operational parameters of the core of a pressurised water nuclear reactor, wherein it comprises:
- a step of evaluation of the actual values of the operational parameters, at least according to the values acquired;
- a step of selection of a law to control the concentration of the absorbent component and the positions of insertion of the groups of rods selected from at least first and second control laws which are different from one another; and
- a step of regulation of the operational parameters by means of the control law selected in accordance with set points relating to the said parameters and the actual values evaluated.

The method can also have one or more of the following characteristics, considered individually or according to all the combinations technically possible:
- the operational parameters regulated comprise at least the mean temperature of the primary cooling fluid in the core, the axial distribution of thermal power between the high and low zones of the core and a parameter which is representative of the capacity to increase the power of the reactor, the capacity to increase the power corresponding to the thermal power which can be produced by the core when the groups of rods are raised rapidly to the vicinity of the high position;
- in the selection step, the first law is selected when at least one group of rods is in an insertion position lower than a predetermined position, and the second law is selected in the opposite case;
- the method comprises a first step of calculation of set points of the operational parameters at least according to control set points;
- the first step comprises a sub-step of calculation of the mean temperature set point of the primary cooling fluid in the core, on the basis of a value which is representative of the power provided to the electricity network which is supplied by the reactor;
- the first step comprises a sub-step of distribution of the groups of rods into a sub-set for control of the mean temperature of the primary cooling fluid in the core, and a heavy sub-set which assures substantially the control of the axial distribution of power, the groups of rods of the heavy sub-set being inserted less far than those of the other sub-set;
- the parameter which is representative of the capacity to increase the power of the reactor is determined at least on the basis of the positions of insertion of the group(s) of rods of the control sub-set, the first step comprising a sub-step of calculation of a position set point for the group(s) of rods of the control sub-set according to a set point for the capacity to increase the power and to values acquired;
- the step of regulation by means of the first control law comprises:
    - a sub-step of calculation of the displacements to be carried out for the group(s) of rods of the control sub-set according to the set point and to the actual value of the mean temperature of the primary cooling fluid in the core; and
    - a sub-step of modification of the position(s) of insertion of the group(s) of rods of the control sub-set according to the displacements calculated for the purpose of regulating the mean temperature of the primary cooling fluid in the core to the set point;

the step of regulation by means of the first control law comprises:
- a sub-step of calculation of the displacements to be carried out for the group(s) of rods of the control sub-set and of the displacement to be carried out for the heavy sub-set according to the set point and to the actual value of the axial distribution of thermal power; and
- a sub-step of modification of the position(s) of insertion of the group(s) of rods of the control sub-set and/or of the heavy sub-set according to the displacements calculated for the purpose of regulating the axial distribution of thermal power to the set point;

the step of regulation by means of the first control law comprises:
- a sub-step of calculation of the concentration of the absorbent component according to the set point and to the actual value of the parameter representative of the capacity to increase the power of the reactor; and
- a sub-step of adjustment of the concentration of the absorbent component in the primary cooling fluid to the concentration calculated in order to regulate the parameter representative of the capacity to increase the power of the reactor to its set point;

the step of regulation by means of the second control law comprises:
- a sub-step of calculation of the displacement(s) to be carried out for the group(s) of rods of the control sub-set and of the displacement to be carried out for the heavy sub-set according to the set point and to the actual value of the mean temperature of the primary cooling fluid in the core, and according to the set point and the actual position of the group P1; and
- a sub-step of modification of the position(s) of insertion of the group(s) of the control sub-set and/or of the heavy sub-set according to the displacements calculated, for the purpose of regulating the mean temperature of the primary cooling fluid in the core to the set point;

the control sub-set is displaced as a priority in order to regulate the mean temperature of the primary cooling fluid in the core, the heavy sub-set being displaced when the control sub-set has reached the limits of a dead band centred on its position set point;

the step of regulation by means of the second control law comprises:
- a sub-step of calculation of the concentration of the absorbent component according to the set point and to the actual value of the axial distribution of thermal power; and
- a sub-step of adjustment of the concentration of the absorbent component in the primary cooling fluid to the concentration calculated in order to regulate the axial distribution of thermal power to the set point;

the step of regulation by means of the second control law comprises:
- a sub-step of calculation of the displacement(s) to be carried out for the group(s) of rods of the control sub-set and of the displacement to be carried out for the heavy sub-set according to the set point and to the actual value of the positions of insertion of the group(s) of rods of the control sub-set; and
- a sub-step of modification of the positions of insertion of the group(s) of the control sub-set and/or of the heavy sub-set according to the displacements calculated, in order to maintain the group(s) of the control sub-assembly in a dead band around the insertion position set point;

the groups of rods of the control sub-set are inserted or extracted sequentially when the thermal power produced by the core varies, two groups which are inserted or extracted in succession having respective insertion positions which are separated from one another by a difference which is constantly less than a predetermined limit.

BRIEF DESCRIPTION OF THE DRAWINGS

Other characteristics and advantages of the invention will become apparent from the description which is provided of it hereinafter by way of indication which is in no way limiting, with reference to the attached figures, in which.

DESCRIPTION OF PREFERRED EMBODIMENTS

Figure 1:
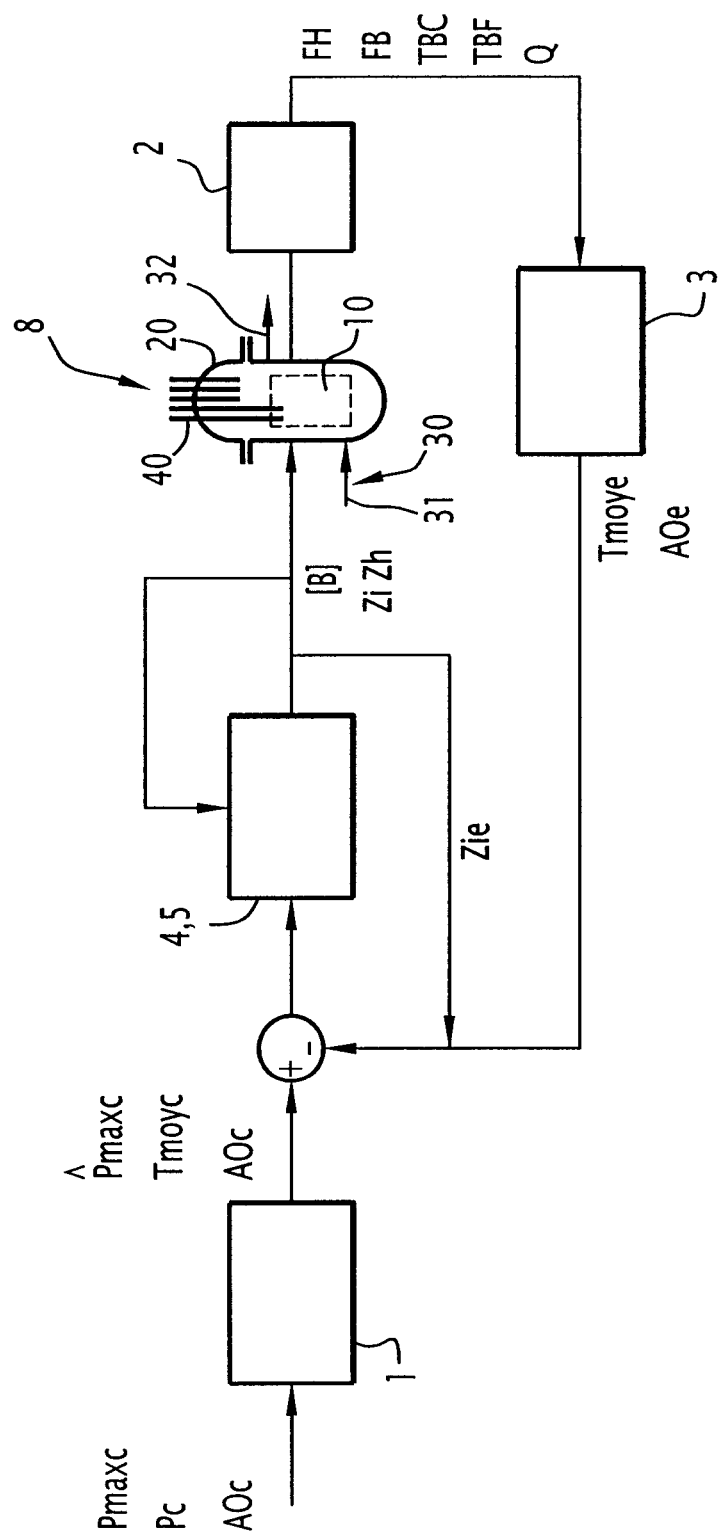
FIG. 1 is a schematic representation showing the main steps of the method according to the invention.
Figure 2:
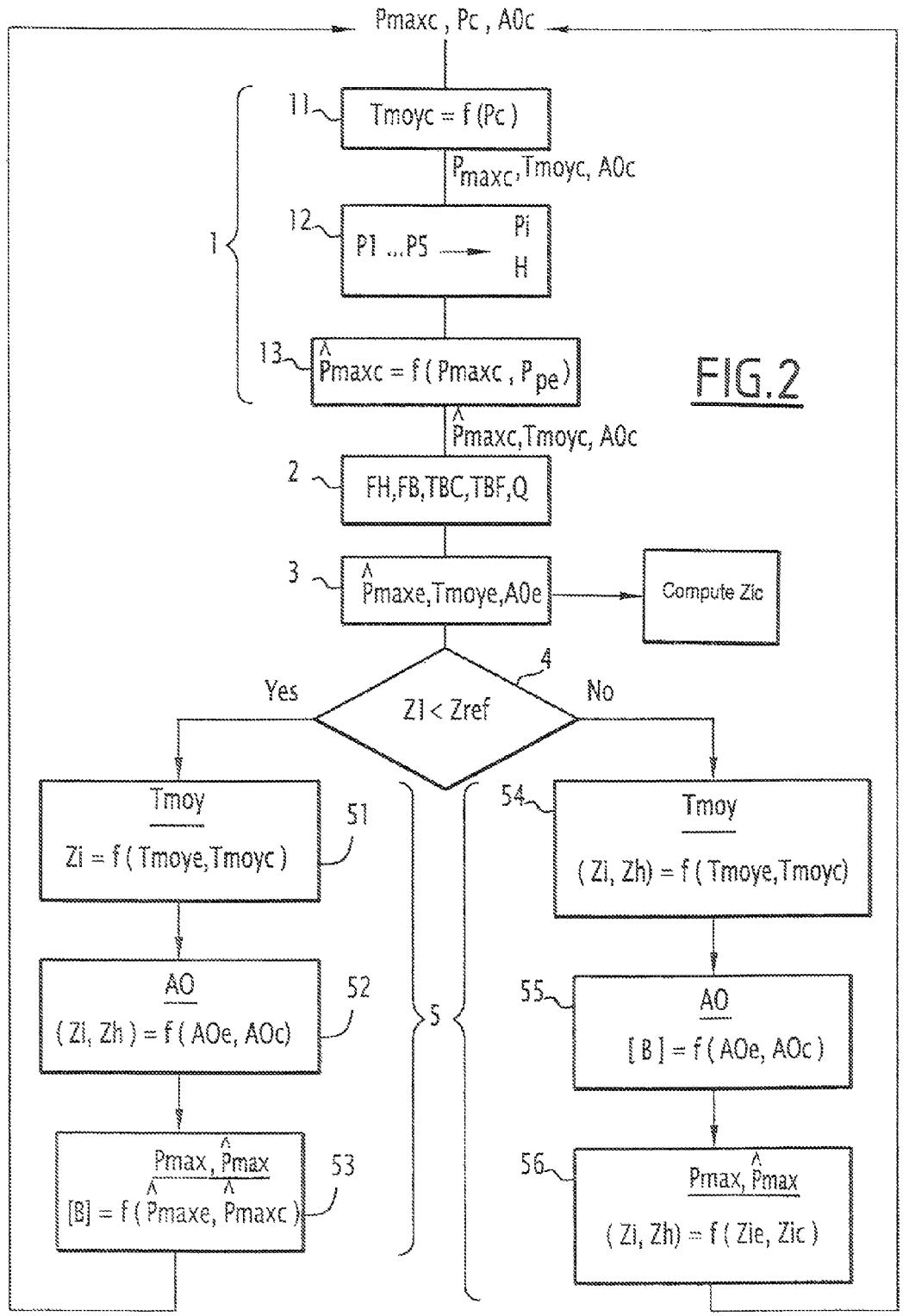
FIG. 2 is a process diagram showing the steps of the two control laws implemented in the method in FIG. 1.

The method which is shown schematically in FIGS. 1 and 2 is intended to regulate the core of a nuclear reactor, and in particular of a pressurised water reactor.

This reactor 8 is shown symbolically in FIG. 1, and comprises:

a core 10 comprising nuclear fuel assemblies;

a vessel 20 inside which the core 10 of the reactor is disposed;

a steam generator (not shown);

a steam turbine (not shown) which can drive a generator which is connected to the electricity distribution network;

a primary circuit 30 which connects the vessel 20 in a closed circuit to a primary side of the steam generator;

a secondary circuit (not shown) which connects a secondary side of the steam generator in a closed circuit to the turbine.

The core 10 produces variable thermal power. It is divided into a high zone and a low zone.

The primary circuit 30 can assure circulation through the core 10 of a primary cooling fluid, comprising substantially water and dissolved boron, this liquid heating up in contact with the nuclear fuel assemblies, then yielding its heat by passing into the steam generator. The secondary circuit can assure the circulation of a secondary cooling fluid, comprising substantially water, this fluid being vaporised in the steam generator by the heat yielded by the primary fluid. The steam drives the turbine, and is then re-condensed and returned to the steam generator.

The generator provides the network with electric power which is variable according to the demand from the network. The reactor is controlled such as to adapt the thermal power supplied by the core continually to the electric power demanded by the network, by varying the reactivity within the core of the reactor.

For this purpose, the reactor is equipped with the following means:

means for adjusting the concentration of boron dissolved in the primary cooling fluid, by injection of a concentrated boric acid solution into the primary fluid, when it is wished to increase the concentration, or by injection of pure water when it is wished to decrease the concentration;

rods 40 to control the reactivity of the core (FIG. 1), each able to occupy in the core 10 a plurality of insertion positions which are stepped vertically starting from a high position; the control rods 40 are distributed for example in five groups P1 to P5, the rods of a single group all being displaced jointly;

means for inserting each group of rods P1 to P5 selectively into the core vertically, from the top downwards, as far as one of the insertion positions;

means for acquiring values FH and FB which are representative of the thermal powers produced in the high and low zones of the core, of the temperature TBF of the primary fluid in the cold branch 31 of the primary circuit, i.e. immediately upstream from the core, of the temperature TBC of the primary fluid in the hot branch 32 of the primary circuit, i.e. immediately downstream from the core, and of the flow Q of primary fluid into the primary circuit.

The boron in solution in the primary fluid absorbs the neutrons emitted by the nuclear fuel assemblies, such that the reactivity of the core 10 decreases when the concentration of boron increases.

In a pressurised water nuclear reactor, the nuclear fuel assemblies each comprise a bundle of tubes with long lengths containing pellets of fissile material, known as fuel rods. These fuel rods are disposed vertically, parallel to one another, and are assembled by bracing grids. In certain assemblies a plurality of fuel rods is replaced by hollow tubes known as guide tubes.

The control rods each comprise a bundle of tubes containing a material which absorbs the neutrons. These tubes have the same length as the fuel assemblies. They are connected to one another such as to constitute a cluster which is mobile in a single piece in a vertical direction. Each cluster can be inserted in the guide tubes of a fuel assembly, such that the tubes made of material which absorbs the neutrons are interposed in the network of fuel rods containing the fuel pellets. The reactivity of the core decreases when a control rod is inserted. The lower the control rod, i.e. the further it is from its high position, the lower the reactivity of the core is.

The values which are representative of the thermal powers produced in the high and low parts of the core are the neutron fluxes FH and FB in the high and low parts of the core, which are measured by means of sensors disposed at different heights in the core.

The regulation method shown in FIG. 1 makes it possible to regulate automatically a plurality of operational parameters of the core of the reactor, according to control set points which are determined by the operator who is running the reactor, or which are imposed externally, for example by the electricity distribution network.

The parameters which are regulated comprise at least the mean temperature of the primary cooling fluid in the core Tmoy, the axial distribution of thermal power between the high and low zones of the core AO, and a parameter $\hat{P}$ max which is representative of the capacity to increase the power of the reactor Pmax.

The concentration of boron in the primary fluid and the positions of the groups of rods P1 to P5 are modified automatically in order to regulate the operational parameters, without intervention by the operators, or with very limited interventions by the operators, for example in order to modify the control set points, or to validate the commands for displacement of the groups of rods or for modification of the concentration of boron planned according to the regulation method.

The capacity to increase the power Pmax corresponds to the thermal power which can be produced by the core when the groups of rods P1 to P5 are raised rapidly to the top of the core, in the vicinity of their high position.

The axial distribution of power AO is expressed by means of the following ratio:

$$AO=(FH-FB)/(FH+FB) \qquad (1)$$

wherein FH and FB are the neutron fluxes respectively in the high and low parts of the core.

The temperature Tmoy is expressed by means of the following ratio:

$$Tmoy=(TBC+TBF)/2 \qquad (2)$$

The set points for controlling of the core comprise a value Pc which is representative of the secondary power to be supplied by the turbine, a set point for the capacity to increase the power of the reactor Pmaxc, and a set point for axial distribution of thermal power between the high and low zones of the core AOc. The value which is representative of the secondary power Pc is for example a thermal power measurement supplied by the secondary circuit of the reactor. As a variant, the set point used can be a set point for the electrical power supplied by the generator to the network.

As shown in FIG. 1, the regulation method comprises:

a first step 1 for calculation of set points (Tmoyc, AOc, $\hat{P}$ maxc) of the operational parameters according to the control set points (Pc, AOc, Pmaxc) which are determined by the operator, and to the actual primary thermal power (Ppe) supplied by the core to the primary circuit;

a second step 2 of acquisition of the actual values of the values (FH, FB) which are representative of the thermal powers produced in the high and low zones of the core, of the temperatures of the primary cooling fluid in the hot and cold branches (TBC, TBF) and of the flow of primary fluid (Q);

a third step 3 of evaluation of the actual values (Tmoye, AOe, $\hat{P}$ maxe) of the operational parameters, at least according to the values acquired (FH, FB, TBC, TBF, Q);

a fourth step 4 of selection of a control law for the concentration of boron [B] and of the positions of insertion Z1 to Z5 of the groups of rods P1 to P5, selected from amongst first and second control laws, which are different from one another;

a fifth step 5 of regulation of the operational parameters by means of the control law selected, according to the set points (Tmoyc, AOc, $\hat{P}$ maxc) for the said parameters and to the actual values (Tmoye, AOe, $\hat{P}$ maxe) evaluated.

These different steps are shown in a detailed manner in FIG. 2.

The first step 1 comprises the sub-steps 11 to 13 illustrated in FIG. 2.

In the sub-step 11, the mean temperature set point for the primary cooling fluid in the core Tmoyc is calculated according to the power set point Pc determined by the operator. For this purpose, use is made for example of a predetermined curve which provides the value Tmoyc directly according to Pc.

In the sub-step 12, the groups of rods P1 to P5 are distributed in a sub-set Pi for control of the mean temperature of the primary cooling fluid in the core Tmoy and a heavy sub-set H which is inserted to a slight extent, thus assuring substantially the control of the axial distribution of power AO.

Figure 3:
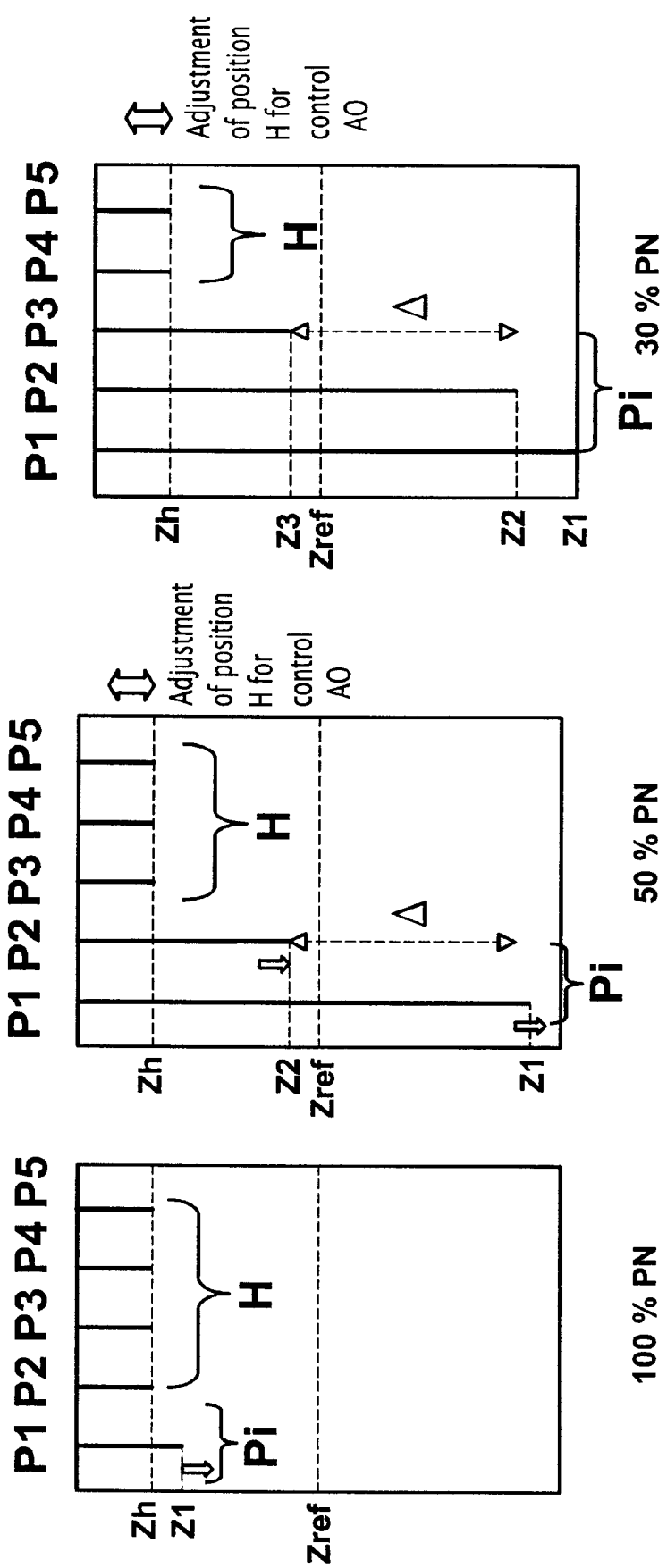
FIGS. 3A, 3B, 3C show schematically the movements of the groups of control rods in a reactor which is controlled by means of the method in FIGS. 1 and 2, when the power set point goes from 100% of the nominal power (FIG. 3A) to 50% of the nominal value (FIG. 3B) then to 30% of the nominal value (FIG. 3C)

As shown by FIGS. 3A to 3C, the groups of the control sub-set Pi can be displaced individually in a co-ordinated manner, for the purpose in particular of controlling the temperature Tmoy. They are displaced as far as insertion positions, which can be different from one another. On the other hand, the groups of the heavy sub-set H are displaced together, as far as an insertion position which is identical for all the groups of the sub-set. The allocation of the clusters which constitute the groups can be modified, in order to be able to minimise the under-burn-up caused by the group P1 in nominal operation, as well as to be able to distribute the number of steps over all of the clusters. The heavy sub-set H is always positioned in the upper half of the core, which means in other words that its insertion position always remains at less than half the height of the core.

When the reactor is close to its nominal power, the control sub-set Pi contains only one group (group P1 in FIG. 3A) and the heavy sub-set H comprises the four other groups.

On the other hand, when the power of the reactor is low, the control sub-assembly Pi contains a plurality of groups (3 groups in FIG. 3C) and the heavy sub-assembly H comprises less than four groups.

Hereinafter in the text, Zi will designate collectively the positions Z1, Z2, etc of the different groups of the sub-set Pi, and Zh will designate the unique position of the groups of the heavy sub-set H.

The set point $\hat{P}$ maxc of the parameter $\hat{P}$ max which represents the capacity to increase the power Pmax of the reactor is calculated in the sub-step 13.

The parameter $\hat{P}$ max corresponds to the vector which has as co-ordinates the positions of insertion Zi of the groups of rods of the sub-set Pi. It is determined by calculation software, on the basis of Pmax and the actual primary power Ppe. The actual primary power Ppe is estimated by means of the following formula:

$$Ppe=C \cdot Q \cdot (TBC-TBF) \qquad (3)$$

C being the calorific capacity of the primary fluid.

The software estimates the variation of the primary power which can be obtained by sequential displacement of the groups of the sub-set Pi upwards or downwards, on the basis of the actual situation of the core (actual concentration of boron in the primary fluid, actual position of the groups), according to the sequential insertion procedure described hereinafter. When the actual primary power Ppe and the curve of variation of the primary power according to the positions Zi are known, it is possible to associate a position vector Zi with a value for capacity to increase the power Pmax.

The set point $\hat{P}$ maxc thus corresponds to a set point Zic for the positions of insertion of the groups of rods of the sub-set Pi. The values Zic are theoretical positions of the groups of rods of the sub-set Pi which make it possible to obtain both actual primary power equal to Ppe and a capacity to increase the power of the reactor which is equal to the set point Pmaxc.

The sequential insertion procedure for the groups of the sub-set Pi is described hereinafter.

As shown in FIGS. 3A to 3C, the position set points are determined by providing sequential insertion of the groups of the sub-set Pi during the variation of power. Thus, for an actual primary power Ppe equal to 100% of the nominal power (FIG. 3A), the sub-set Pi comprises only the group P1, and the group P1 is allocated a position set point Z1c which is only slightly inserted, the four other groups P2 to P5 being consigned to the high position and forming the heavy sub-set H. When the primary power Ppe is lower, the position set point Z1c of the group P1 is selected such as to be lower. When the primary power Ppe is less than a threshold (80% for example), the difference between the position set point of the group P1 and that of the group P2 exceeds a maximum limit (½ the height of the core, for example), and the group P2 is changed over from the sub-set H to the control sub-set Pi. The position set points for the two groups are calculated such as to maintain a constant insertion difference $\Delta$ (in the above example 50% of the height of the core, and preferably between 40% and 60% of the height of the core) which is predetermined between them (see FIG. 3B which illustrates the positions of the groups for a power set point of 50% of the nominal power). When the primary power Ppe is less than another threshold (50% for example), the difference between the position set point of the group P2 and that of the group P3 exceeds a maximum limit (½ the height of the core for example) and the group P3 is changed over from the sub-set H to the control sub-set Pi (FIG. 3C, illustrating the positions of the groups for a power set point of 30%). The position set points for the groups P2 and P3 are calculated such as to maintain the predetermined insertion difference $\Delta$ between them. In parallel, the group P1 is allocated a position set point corresponding to the insertion maximum, such that the difference between the position set points of the group P1 and of the group P2 is reduced.

In the second step 2, the neutron fluxes FH and FB in the high and low parts of the core, the temperatures TBC and TBF of the primary cooling fluid in the hot and cold branches of the primary circuit and the flow Q of primary fluid in the primary circuit are acquired. These values are measured by means of the measuring systems of the reactor, or are picked in the system for operating the reactor.

In the third step 3, the actual values Tmoye, AOe, $\hat{P}$ maxe of the operational parameters Tmoy, AO and $\hat{P}$ max are evaluated. The actual value of the axial distribution of power AOe is calculated by means of the above formula (1), according to the values of the neutron fluxes FH and FB acquired in the second step. The actual value Tmoye of the temperature Tmoy is calculated by means of the above formula (2), according to the temperature values TBC and TBF acquired in the second step. The actual value $\hat{P}$ maxe of the parameter representative of Pmax is calculated on the basis of the actual positions of insertion Zie of the groups of rods of the control sub-set Pi and of the actual primary power Ppe. These positions Zie are picked for example in the computer which controls the means for insertion of the groups of rods. The power Ppe is calculated by means of the above formula (3), in accordance with the temperature values TBF and TBC and with the primary flow value Q acquired in the second step.

In the fourth step 4, the first control law is selected when at least one group of rods is in an insertion position lower than a predetermined position Zref, and the second control law is selected in the opposite case.

The second law is thus used in particular when all the groups P1 to P5 are in the high part of the reactor, i.e. when the reactor is operating at power close to the nominal power.

The first control law is used when at least one of the groups is in the low part of the reactor, i.e. when the reactor is operatin at power which is for example less than 90% of the nominal power, or during operating with partial power with the groups of rods in the high part of the core.

The step for regulation 5 of the method when the first control law is used is broken down in the left-hand part of FIG. 2.

The step for regulation 5 by means of the first control law comprises a module 51 for regulation of the temperature Tmoy, a module 52 for regulation of the axial distribution of power AO, and a module 53 for regulation of the capacity to increase the power Pmax.

The module 51 for regulation of Tmoy is broken down into:
 a sub-step for calculation of the displacements dZi to be carried out for all the groups of rods of the control sub-set Pi according to the set point Tmoyc and to the actual value Tmoye of the mean temperature of the primary cooling fluid in the core; and
 a sub-step for modification of the positions of insertion Zi of all the groups of rods of the control sub-set Pi according to the displacements dZi calculated in the preceding sub-step, in order to regulate the mean temperature of the primary cooling fluid in the core Tmoy to the set point Tmoyc.

The module 52 for regulation of the distribution of power AO is broken down into:
 a sub-step for calculation of the displacement dZh to be carried out for the heavy sub-set H and of the displacements dZi to be carried out for the groups of rods of the control sub-set Pi, according to at least the set point AOc and to the actual value AOe of the axial distribution of thermal power; and
 a sub-step of modification of the positions of insertion Zi of the group(s) of rods of the control sub-set Pi and/or of the heavy sub-set H according to the displacements dZi and dZh calculated for the purpose of regulation of the axial distribution of thermal power AO to the set point AOc.

As previously described, the difference between the actual value Tmoye and the set point Tmoyc for the mean temperature of the cooling fluid is used in the calculation of the displacements of the sub-sets Pi and H.

In addition, the control sub-et Pi and the heavy sub-set H are preferably displaced in opposite directions in order to regulate the axial distribution of thermal power AO, so as not to disrupt the temperature of the primary fluid Tmoy. This is true in particular when Tmoy is in a dead band around its set point Tmoyc.

Figure 4:
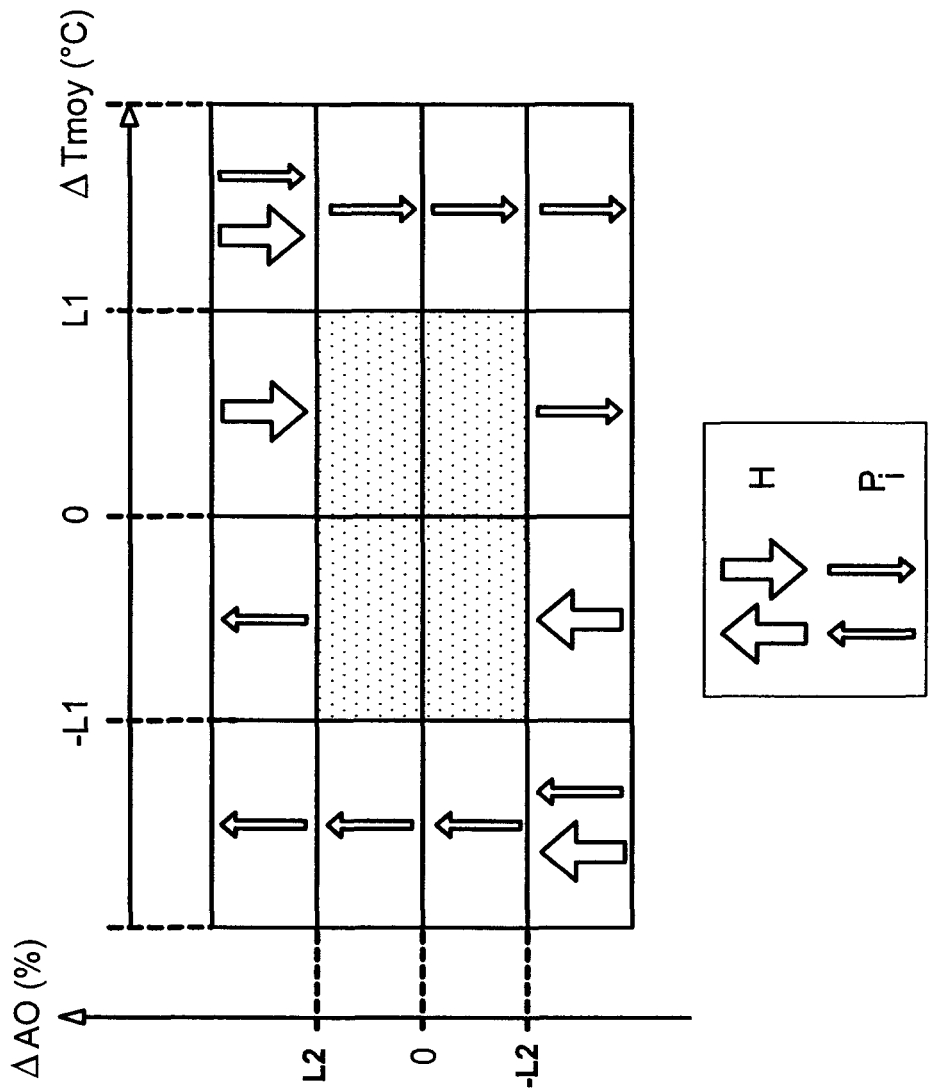
FIG. 4 is a schematic representation of the logic of movement of the groups according to the method in FIGS. 1 and 2, according to the difference $\Delta Tmoy$ between the actual mean temperature of the cooling fluid and the temperature set point (x-axis, expressed in $°C$.), and to the difference $\Delta AO$ between the current distribution of power and the power distribution set point (y-axis, expressed as a percentage) for the first control law (at least one group inserted in the low part of the core)

FIG. 4 represents the logic of displacement of the groups in different situations, according to the difference $\Delta$Tmoy between the actual temperature Tmoye and the set point Tmoyc, and to the difference $\Delta$AO between the axial distribution of actual power AOe and the set point AOc.

The grey area represents the field in which AO and Tmoy are each in a dead band around their respective set points, and in this case the modules for regulation of the temperature Tmoy and for the distribution of power AO do not include any action on the control groups.

It can be seen that, when AO is in its dead band and Tmoy is out of its band, the control sub-set Pi is displaced by the module for regulation of Tmoy in a direction which makes it possible to bring Tmoy into the dead band.

Figure 5A:
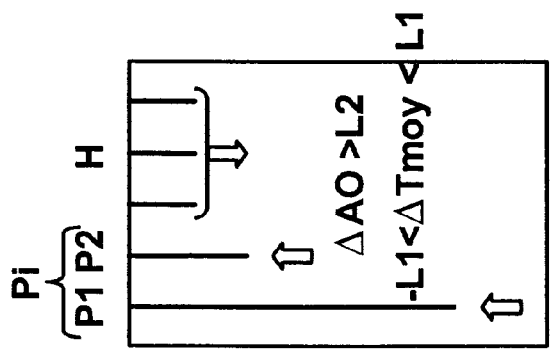
FIGS. 5A to 5D show schematically the movements of the groups according to the first control law, for the purpose of regulating the axial distribution of power, in different situations.
Figure 5C:
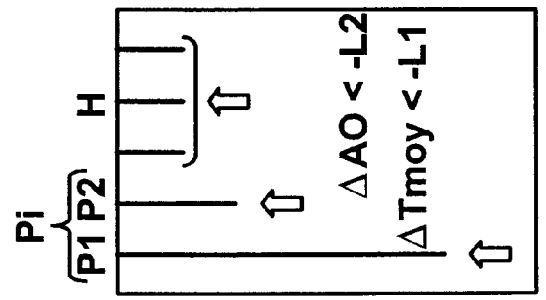
Figure 5B:
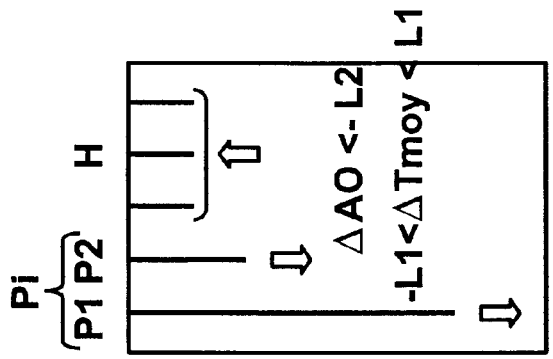

Conversely, when Tmoy is in its dead band and AO is out of its band, the module for regulation of the distribution of power commands the displacement either of the sub-et Pi or of the heavy sub-set H, according to the sign of the temperature difference. For example, if $\Delta$AO>L2 and $\Delta$Tmoy is positive, with $\Delta$AO=AOe−AOc and $\Delta$Tmoy=Tmoye−Tmoyc, the sub-set H is displaced downwards. This has the effect of bringing the axial distribution of power towards the set point, and also of decreasing Tmoy, such that $\Delta$Tmoy becomes negative. The situation then arises in which $\Delta$AO>L2 and $\Delta$Tmoy is negative. The module for regulation of the distribution of power then displaces the sub-set Pi upwards, as shown in FIG. 5A, which compensates for the displacement of the sub-set H downwards in relation to the temperature control. The situation is the same when $\Delta$AO is negative (see the lowest line in FIG. 4 and FIG. 5B).

Figure 5D:
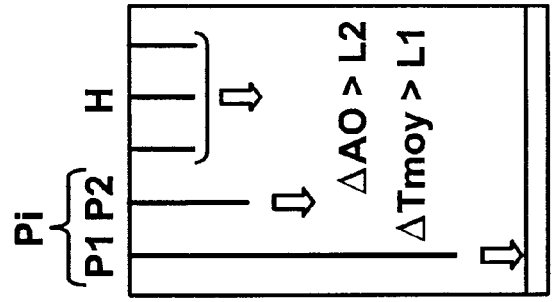

On the other hand, when AO and Tmoy are out of their respective dead bands at the same time, the control strategy for AO is different. The sub-set Pi is displaced according to the sign of the temperature difference $\Delta$Tmoy by the module for regulation of the temperature. The heavy sub-set H is displaced by the module for regulation of the distribution of power, such as to bring AO towards its set point, but this displacement is inhibited if it goes in the direction of increasing the deviation of Tmoy relative to the set point. Thus, when $\Delta$AO>L2 and $\Delta$Tmoy<−L1, the sub-set Pi is displaced upwards in order to make Tmoy increase. The heavy sub-set H should be displaced downwards in order to bring AO towards its set point, but this displacement is inhibited, since it would lead to a decrease in Tmoy, and would therefore move the temperature away from its set point. The heavy sub-set H is therefore not displaced in this case. The displacement of the heavy sub-set H is also inhibited when $\Delta$AO<−L2 and $\Delta$Tmoy>L1. On the other hand, the displacement of the heavy sub-set H is not inhibited in the other cases, i.e. when $\Delta$AO<−L2 and $\Delta$Tmoy<−L1 (FIG. 5C), and $\Delta$AO>L2 and $\Delta$Tmoy>L1 (FIG. 5D).

The module 53 for regulation of the capacity to increase the power of the reactor Pmax is broken down into:
 a sub-step for calculation of the concentration of boron [B] in the primary fluid according to the set point $\hat{P}$maxc and to the actual value $\hat{P}$ maxe of the parameter which is representative of Pmax; and
 a sub-step for adjustment of the concentration of boron [B] in the primary cooling fluid to the concentration calculated for the purpose of regulating the parameter $\hat{P}$ max to the set point $\hat{P}$ maxc.

In fact, when $\hat{P}$ max is lower than a dead band centred on the set point $\hat{P}$ maxc (groups of the sub-set Pi not inserted far enough), the module for regulation of Pmax gives rise to dilution of the primary fluid by injection of water which does not contain boron. The concentration of boron decreases, which gives rise to an increase in the reactivity in the core, and therefore to an increase in the temperature of the primary fluid Tmoy. The module for control of Tmoy then displaces the control sub-set Pi downwards in order to decrease Tmoy, as previously explained, such that $\hat{P}$ max, which corresponds to the vector of the insertion positions Zi, is brought into its dead band.

Conversely, when $\hat{P}$ max is greater than its dead band (groups of the sub-set Pi inserted too far), the module for regulation of Pmax gives rise to injection of concentrated boron into the primary fluid. The reactivity of the core decreases, which gives rise to a decrease of Tmoy and causes displacement of the control sub-set Pi upwards by means of the module for control of Tmoy.

In a variant embodiment, in order to minimise the effluents, the module for regulation of Pmax 53 is partially or totally inhibited during power transient. Thus, in the embodiment in FIGS. 6A to 6C, the module 53 does not intervene during the phase of reduction of the power and during the low stage for as long as $\hat{P}$ max>$\hat{P}$ maxc.

Figures 6A, 6B, 6C:
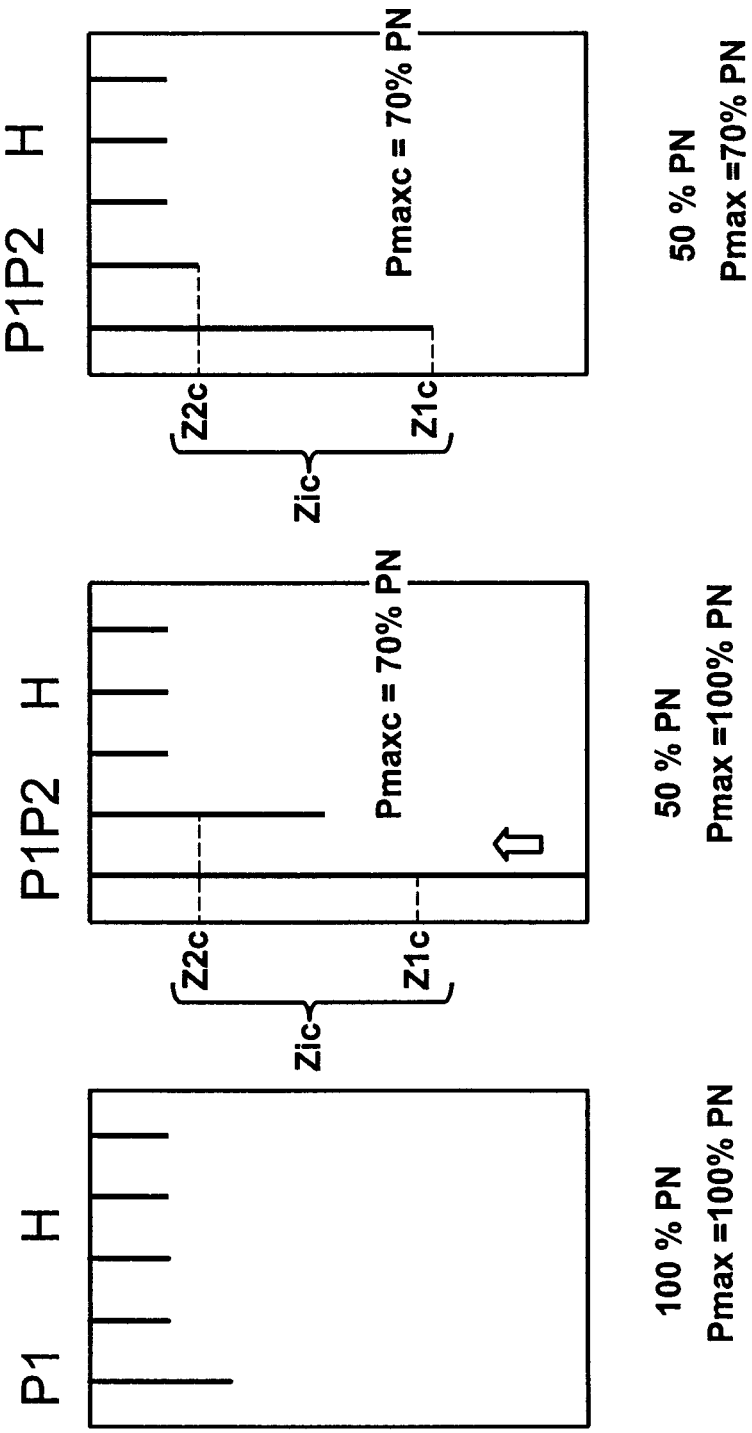
FIGS. 6A to 6C show schematically the position of the control groups, for the purpose of regulating the capacity to increase the power of the reactor for 2 power levels (100% and 50%); and 2 different values for capacity to increase the power (Pmax=100% and 70%)

FIGS. 6A to 6C illustrate a sequence of functioning of the reactor in which the reactor goes from an actual primary thermal power Ppe of 100% of the nominal power PN (FIG. 6A) to 50% of the nominal power PN (FIG. 6B), then forms a stage at 50% of the nominal power PN (FIG. 6C). The set point Pmaxc is set at 70% of the nominal power PN throughout the entire sequence.

At 100% of the nominal power (FIG. 6A) all the groups are situated in the high part of the core. In this case the value of Pmax is 100% of the nominal power, which is higher than the set point Pmaxc. The module for control of Pmax does not undertake any action.

When the reactor reaches 50% of the nominal power (FIG. 6B), the groups P1 and P2, which constitute the sub-set Pi, are inserted in the core. The value of Pmax is then 100% of the nominal power, since it is possible to restore the reactor very rapidly to nominal power by returning the groups P1 and P2 to the high position. The module for control of Pmax does not undertake any action, since the actual value of Pmax is higher than the set point Pmaxc. The actual value $\hat{P}$ maxe of the parameter $\hat{P}$ max then corresponds to positions Zie which are inserted further in than the position set points Zic corresponding to the set point $\hat{P}$ maxc of the parameter $\hat{P}$ max.

During the stage at 50% of the nominal power, xenon is produced inside the fuel rods which constitute the fuel assemblies under the effect of the nuclear reactions, which has the effect of decreasing the reactivity of the core and decreasing the temperature Tmoy. The module for control of Tmoy then gives rise to the displacement of the control sub-set Pi upwards, such as to counterbalance the effects of the xenon and to keep Tmoy constant. The thermal power produced by the core also remains constant. Thus, the raising of the sub-set Pi reduces Pmax, since it is no longer possible to revert to 100% of the nominal power by bringing the groups P1 and P2 up to the high position.

When the sub-set Pi reaches the position set point Zic corresponding to the set point $\hat{P}$ maxc, the module for control of Pmax gives rise to dilution of the primary fluid such as to stop the raising of the sub-set Pi under the effect of the production of xenon (FIG. 6C). The position set point Zic and the set point $\hat{P}$ maxc are calculated as previously described, according to the set point Pmaxc (in this case 70% of the nominal power) and to the primary power Ppe (in this case 50% of the nominal power).

The step of regulation 5 of the method when the second control law is used is broken down in the right-hand part of FIG. 2.

As previously stated, the second law is used when all the groups P1 to P5 are in the high part of the reactor, i.e. when the reactor is functioning at a power level which is close to the nominal power or during functioning at partial power with the clusters extracted. Consequently, the control sub-set Pi contains only the group P1, and the heavy sub-set H comprises the four other groups. In this case $\hat{P}$ max=Z1. In fact, the set point $\hat{P}$ maxc is a position set point of P1, noted as Z1c in the following paragraphs. Similarly, the actual value $\hat{P}$ maxe of the parameter $\hat{P}$ max is in fact the actual position Z1e of the group P1.

As in the case of the first control law, the regulation step comprises a module 54 for regulation of the temperature Tmoy, a module 55 for regulation of the axial distribution of power AO, and a module 56 for regulation of the capacity to increase the power Pmax.

The module 54 for regulation of Tmoy comprises:
  a sub-step of calculation of the displacement dZ1 to be carried out for the group of rods P1 (forming the control sub-set Pi) and of the displacement dZh to be carried out for the heavy sub-set H according to the set point Tmoyc, of the actual value Tmoye of the mean temperature of the primary cooling fluid in the core and of the set point Z1c and actual position Z1e of the group P1; and
  a sub-step of modification of the positions of insertion of the group P1 and/or of the heavy sub-set H according to the displacements dZ1 and dZh calculated, in order to regulate the mean temperature of the primary cooling fluid in the core Tmoy to the set point Tmoyc.

The group P1 is displaced as a priority in order to regulate Tmoy, within the limits of a dead band which is centred on the position set point Z1c. The heavy sub-set H is displaced when the group P1 reaches the limits of the dead band.

Figure 7:
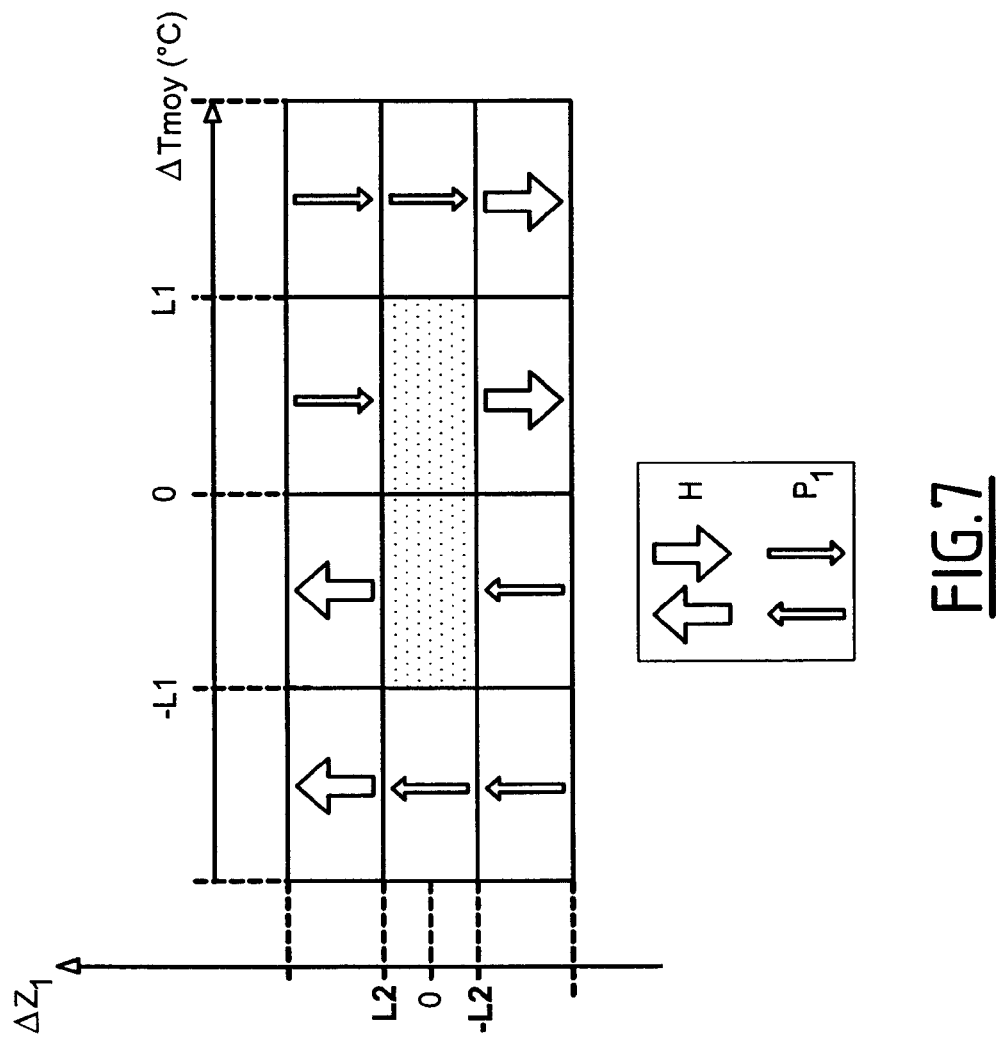
FIG. 7 shows schematically the logic of displacement of the control groups, according to the difference $\Delta Tmoy$ between the actual mean temperature of the primary cooling fluid and the temperature set point (x-axis, expressed in $°C$.), and the difference $\Delta Z1$ between the actual position of the control group P1 and the position set point (y-axis), for the second control law.

This control strategy is shown in FIG. 7 which represents the logic of movement of the groups according to the difference ΔTmoy between the actual value of Tmoye and the set point Tmoyc (x-axis) and according to the difference ΔZ1 between the actual position Z1e of the group P1 and the set point Z1c (y-axis), with ΔTmoy=Tmoye−Tmoyc, and ΔZ1=Z1e−Z1c.

It can be read in the central band of the table that when P1 in is a dead band centred on the set point Z1c and ΔTmoy<−L1, the group P1 is displaced upwards. When ΔZ1 reaches L2, the heavy sub-set H is displaced upwards.

Similarly, when P1 is in the dead band which is centred on the set point Z1c and ΔTmoy>L1, the group P1 is displaced downwards. When ΔZ1 reaches −L2, the heavy sub-set H is displaced downwards.

The module 55 for regulation of the axial power distribution comprises:
  a sub-step for calculation of the concentration of the absorbent component [B] according to the set point AOc and to the actual value AOe of the axial distribution of thermal power; and
  a sub-step for adjustment of the concentration of the absorbent component [B] in the primary cooling fluid to the concentration calculated in order to regulate the axial distribution of thermal power AO to the set point AOc.

More specifically, when AO is greater than the set point AOc, the module for regulation of AO commands dilution of the primary cooling fluid by injection of water which does not contain boron. This dilution has the effect of increasing the reactivity of the core, and thus the temperature Tmoy, which gives rise to the intervention of the module for control of Tmoy. The latter will then command the insertion of the group P1 and/or of the sub-set H, as previously described, which gives rise to decrease of the thermal power in the high part of the reactor, and thus to the decrease of AO.

Conversely, when AO is lower than the set point AOc, the module for regulation of AO commands injection of a concentrated boron solution in the primary fluid. This injection has the effect of decreasing the reactivity of the core and thus the temperature Tmoy, which gives rise to the withdrawal of the group P1 and/or of the sub-set H, by means of the module for control of Tmoy. The thermal power in the high part of the reactor increases, which gives rise to the increase of AO.

The module 56 for regulation of Pmax comprises:
- a sub-step for calculation of the displacement dZ1 to be carried out for the group P1 (which constitutes the control sub-set Pi) and of the displacement to be carried out dZh for the heavy sub-set H, according to at least the set point Z1c and to the actual value Z1e for the position of insertion of the group P1; and
- a sub-step for modification of the positions of insertion of the group P1 and/or of the heavy sub-set H according to the displacements dZ1 and dZh calculated, in order to keep the group(s) of the control sub-set P1 in a dead band around the insertion position set point Z1c.

The control of Tmoy by means of the second control law means that the group P1 remains in its dead band since, as previously described, H is displaced when P1 reaches the limit of its dead band. The regulation of Pmax is therefore only rarely required. This regulation is described hereinafter.

Figure 8A:
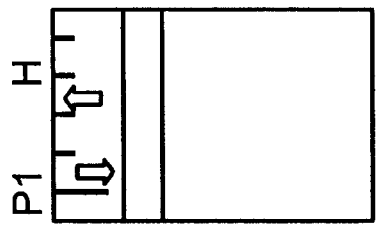
FIGS. 8A and 8B show schematically the movements of the control groups according to the second control law, in different situations.
Figure 8B:
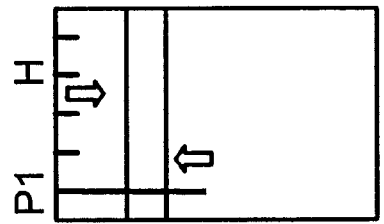

FIG. 7 shows that, when Tmoy is in its dead band, and Z1 is out of its band, the module for regulation of Pmax orders the displacement either of the group P1 or of the heavy sub-set H, according to the sign of the temperature difference ΔTmoy. For example, if ΔZ1>L2 and ΔTmoy is positive, the group P1 is displaced downwards. This has the effect of bringing the group P1 towards the set point, and also of decreasing Tmoy, such that ΔTmoy becomes negative. The module for regulation of Pmax then displaces the sub-set H upwards, which compensates for the displacement of the sub-set P1 downwards in relation to the control of the temperature and to the axial distribution of power (FIG. 8A). The situation is the same when ΔZ1 is negative (see the lowest line in FIG. 7 and FIG. 8B).

Thus, when the mean temperature Tmoy is in its dead band around its set point Tmoye, the control sub-set Pi and the heavy sub-set H are displaced in inverse directions in order to keep the control sub-set in its dead band around its position set point Zic.

It will be noted that the difference between the actual value Tmoye and the set point Tmoyc of the mean temperature is taken into account in the calculation of the displacements of the sub-sets Pi and H.

The method previously described makes it possible to control power transient. During a power transient, the power required from the turbine goes progressively from a value V1 to a value V2.

In the case when V1>V2, the thermal power discharged by the secondary circuit decreases, and, in a first stage, becomes less than the thermal power supplied by the core of the reactor. The temperature Tmoy of the primary fluid thus increases, which gives rise to the intervention of the module for control of Tmoy 51 or 54, depending on the circumstances. This module commands the displacement of the groups of control rods P1 to P5 downwards, which makes it possible to return Tmoy to its set point, whilst keeping the thermal power supplied by the core towards a level which is compatible with the power discharged by the secondary circuit.

The fact of implementing two control laws which are different from one another makes it possible to carry out efficient and fully automatic control of three operational parameters of the reactor (primary fluid temperature Tmoy, axial distribution of thermal power AO, parameter $\hat{P}$ max which is representative of the capacity to increase the power of the reactor Pmax), irrespective of the power set point, and in particular up to 100% of the nominal power of the reactor.

The fact of selecting the control law according to the position of the groups of control rods makes it possible to use two different laws, i.e. a first law which is adapted to the case in which at least one group is inserted in the low part of the core, and a second law which is adapted to the case in which all the groups are in the high part of the core.

The particular embodiment previously described also has other advantages which will now be described. However, it will be noted that the associated characteristics are optional.

In the two laws, the control of Tmoy is obtained by distributing the control groups into a control sub-set and a heavy sub-set, the groups of the control sub-set being inserted sequentially for the purpose of controlling Tmoy.

Also in the two laws, the set point for Pmax is translated into a position set point Zic for the control sub-set Pi, which permits automatic controlling of this parameter.

In the first law, the axial distribution of power AO is regulated to its set point by displacing the groups of rods P1 to P5. When the temperature Tmoy is in a dead band around its set point Tmoye, the sub-sets Pi and H are displaced in inverse directions. In addition, the parameter $\hat{P}$ max which is representative of the capacity to increase the power of the reactor Pmax is regulated to its set point $\hat{P}$ maxc by adjusting the concentration of boron in the primary fluid. This method for controlling AO is efficient only if at least one group is inserted in the low part of the core.

Consequently, in the situation in which all the groups are in the high part of the core, i.e. when the second law is used, there is automatic inversion of the modes for controlling the axial distribution of power AO and the capacity to increase the power Pmax. AO is regulated to its set point by adjusting the concentration of boron. Pi normally remains in its dead band since the sub-set H is acted upon when Pi reaches the limit of its dead band. However, if Pi is outside its dead band, the parameter representative of the capacity to increase the power of the reactor is regulated to its set point by displacing the groups of rods P1 to P5. When the temperature Tmoy is in a dead band around its set point Tmoyc, the sub-sets Pi and H are displaced in inverse directions. The control of AO is thus efficient, even when the reactor is close to its nominal thermal power.

The control method makes it possible to make the reactor function with frequency regulation at high power, without placing excessive demands on the control groups P1 to P5 in the form of displacements which are too frequent.

It should be noted that the procedure for sequential insertion of the groups of the sub-set Pi, wherein a difference of a half-core is maintained between the positions of two groups inserted in succession, makes it possible to maintain at least one group in the low part of the core for a very wide range of power of the reactor.

The method has been described for a reactor, the control clusters of which are distributed into five groups P1 to P5, but it also applies to the control of a reactor, the control clusters of which are distributed in more or less than five groups.

Similarly, the second control law has been described in the case in which the control sub-set contained only a single group. However, the second control law could also apply to the case in which the control sub-set contains two groups or more.

The parameter $\hat{P}$ max which is representative of the capacity to increase the power could take into account not only the positions of insertion Zi of the groups of the sub-set Pi, but also the position of insertion Zh of the heavy sub-set H, which would constitute an additional co-ordinate of the vector $\hat{P}$ max. In this case, the set point $\hat{P}$ maxc would be established in the sub-step 13, by "fixing" Zh in its actual position. The position set points Zic associated with the set point $\hat{P}$maxc would thus be dependent on the actual position Zh of the heavy sub-set H.

The method previously described is implemented by one or more computers which control automatic means for modification of the concentration of boron and for displacement of the groups of rods.

The invention claimed is:

1. A method for regulating operational parameters of the core of a pressurized water nuclear reactor, the nuclear reactor having:
    a core which is divided into an upper zone and a lower zone, and produces thermal power;
    a plurality of groups of rods for controlling the reactivity of the core, each of which occupies, in the core, a plurality of insertion positions which are stepped vertically starting from an upper position;
    means for inserting each group of rods in the core vertically;
    a primary circuit which assures the circulation of a primary cooling fluid through the core;
    means for adjusting the concentration of a neutron-absorbent component in the primary cooling fluid; and
    means for acquiring values which are representative of the conditions of operation of the core of the reactor,
wherein the regulation method comprises:
    a step of acquiring values representative of (1) thermal power produced in the upper and lower zones of the core, (2) temperatures of hot and cold branches, and (3)flow of primary cooling fluid, which are representative of the conditions of operation of the core of the reactor;
    a step of evaluation of actual values of (i) mean temperature of the primary cooling fluid in the core, (ii) axial distribution of thermal power between the upper and lower zones of the core, and (iii) a parameter representative of capacity to increase power of the reactor corresponding to the thermal power which is produced by the core when the groups of rods are raised to the vicinity of the upper position, which values (i)-(iii) are collectively the operational parameters, this evaluation being performed at least as a function of the values acquired;
    a step of selection of either a first control law or a second control law to control (a) the concentration of the absorbent component, and (b) positions of insertion of the groups of rods, the first control law being different from the second control law, wherein the first control law is selected as soon as at least one group of rods is in an insertion position lower than a predetermined position, and the second control law is selected as soon as all the groups of rods are in respective insertion positions above said predetermined position;
    a step of calculating set points of the operational parameters at least as a function of control set points; and
    a step of regulation of the operational parameters as a function of set points relating to said parameters and of the actual values evaluated, by means of the selected control law,
    wherein the first control law comprises the following steps, in any order:
        modifying the positions of insertion of the groups of rods as a function of the deviation of the mean temperature of the primary cooling fluid in the core with regard to its set point, in order to regulate the mean temperature of the primary cooling fluid in the core to its set point;
        modifying the positions of insertion of the groups of rods as a function of the deviation of the axial distribution of power with regard to its set point, in order to regulate the axial distribution of power to its set point; and
        adjusting the concentration of the neutron-absorbent component in the primary cooling fluid as a function of the deviation from its set point of the parameter which is representative of the capacity to increase power of the reactor corresponding to the thermal power produced by the core when the groups of rods are raised to the vicinity of the upper position, which is representative of the capacity to increase the power of the reactor to its set point, in order to regulate the said increase power capacity to its set point; and
    wherein the second control law comprises the following steps, in any order:
        modifying the positions of insertion of the groups of rods as a function of the deviation of the mean temperature of the primary cooling fluid in the core with regard to its set point, in order to regulate the mean temperature of the primary cooling fluid in the core to its set point;
        adjusting the concentration of the neutron-absorbent component in the primary cooling fluid as a function of the deviation of the axial distribution of power with regard to its set point, in order to regulate the axial distribution of power to its set point; and
        modifying the positions of insertion of the groups of rods as a function of the deviation from its set point of the parameter which is representative of the capacity to increase power of the reactor corresponding to the thermal power produced by the core when the groups of rods are raised to the vicinity of the upper position, which is representative of the capacity to increase the power of the reactor to its set point, in order to regulate the said increase power capacity to its set point.

2. The method according to claim 1, wherein the step of calculating set points of the operational parameters further comprises a sub-step of calculation of the mean temperature set point of the primary cooling fluid in the core, on the basis of a value which is representative of the power provided to an electricity network which is supplied by the reactor.

3. The method according to claim 2, wherein the step of calculating set points of the operational parameters further comprises a sub-step of distribution of the groups of rods into a sub-set for control of the mean temperature of the primary cooling fluid in the core, and a heavy sub-set which assures substantially the control of the axial distribution of power, the groups of rods of the heavy sub-set being inserted less far than those of the other sub-set.

4. The method according to claim 3, wherein the heavy sub-set is always positioned in the upper half of the core.

5. The method according to claim 3, wherein the parameter which is representative of the capacity to increase the power of the reactor is determined at least on the basis of the positions of insertion of the group(s) of rods of the control sub-set, the step of calculating set points of the operational parameters comprising a sub-step of calculation of a position set point for the group(s) of rods of the control sub-set as a function of a set point for the capacity to increase the power and to values acquired.

6. The method according to claim 5, wherein the step of regulation by means of the first control law further comprises:
- a sub-step of calculation of a displacement to be carried out for the group(s) of rods of the control sub-set as a function of the set point and to the actual value of the mean temperature of the primary cooling fluid in the core; and
- a sub-step of modification of the position(s) of insertion of the group(s) of rods of the control sub-set as a function of the displacements calculated for the purpose of regulating the mean temperature of the primary cooling fluid in the core to the set point.

7. The method according to claim 5, wherein the step of regulation by means of the first control law further comprises:
- a sub-step of calculation of the displacements to be carried out for the set(s) of rods of the control sub-set and of a displacement to be carried out for the heavy sub-set as a function of at least the set point and the actual value of the axial distribution of thermal power; and
- a sub-step of modification of the position(s) of insertion of the group(s) of rods of the control sub-set and/or of the heavy sub-set as a function of the displacements calculated for the purpose of regulating the axial distribution of thermal power to the set point.

8. The method according to claim 7, wherein, when the mean temperature of the cooling fluid is in a dead band around its set point, the control sub-set and the heavy sub-set are displaced in inverse directions in order to regulate the axial distribution of thermal power to its set point.

9. The method according to claim 5, wherein the step of regulation by means of the first control law further comprises:
- a sub-step of calculation of the concentration of the neutron-absorbent component as a function of the set point and to the actual value of the parameter representative of the capacity to increase the power of the reactor; and
- a sub-step of adjustment of the concentration of the neutron-absorbent component in the primary cooling fluid to the concentration calculated in order to regulate the parameter representative of the capacity to increase the power of the reactor to its set point.

10. The method according to claim 5, wherein the step of regulation by means of the second control law further comprises:
- a sub-step of calculation of the displacement(s) to be carried out for the group(s) of rods of the control sub-set and of the displacement to be carried out for the heavy sub-set as a function of the set point and to the actual value of the mean temperature of the primary cooling fluid in the core, and as a function of the set point and the actual position of the group; and
- a sub-step of modification of the position(s) of insertion of the group(s) of the control sub-set and/or of the heavy sub-set as a function of displacements calculated, for the purpose of regulating the mean temperature of the primary cooling fluid in the core to the set point.

11. The method according to claim 10, wherein the control sub-set is displaced first in order to regulate the mean temperature of the primary cooling fluid in the core, the heavy sub-set being displaced when the control sub-set has reached the limits of a dead band centered on its position set point.

12. The method according to claim 5, wherein the step of regulation by means of the second control law further comprises:
- a sub-step of calculation of the concentration of the neutron-absorbent component as a function of the set point and to the actual value of the axial distribution of thermal power; and
- a sub-step of adjustment of the concentration of the neutron-absorbent component in the primary cooling fluid at the concentration calculated in order to regulate the axial distribution of thermal power to the set point.

13. The method according to claim 5, wherein the step of regulation by means of the second control law further comprises:
- a sub-step of calculation of the displacement(s) to be carried out for the group(s of rods of the control sub-set and of the displacement to be carried out for the heavy sub-set as a function of at least the set point and to an actual value of the positions of insertion of the group(s) of rods of the control sub-set; and
- a sub-step of modification of the positions of insertion of the group(s) of the control sub-set and/or of the heavy sub-set as a function of the displacements calculated, in order to maintain the group(s) of the control sub-set in a dead band around the insertion position set point.

14. The method according to claim 13, wherein, when the mean temperature of the cooling fluid is in a dead band around its set point, the control sub-set and the heavy sub-set are displaced in inverse directions in order to keep the group(s) of the control sub-set in the said dead band around its insertion position set point.

15. The method according to claim 3, wherein the groups of rods of the control sub-set are inserted or extracted sequentially when the thermal power produced by the core varies, two groups which are inserted or extracted in succession, each group having respective insertion positions which are separated from one another by a difference which is constantly less than a predetermined limit.

16. The method according to claim 1, wherein the regulation method is automatic.

17. The method according to claim 1, wherein the set point of the parameter representative of the capacity to increase the power of the reactor is a set point for the positions of insertion of several groups of rods, calculated based on a set point of capacity to increase the power of the reactor and on an actual value of a primary thermal power of the core.

* * * * *